US012560100B1

(12) United States Patent
Macfarlane

(10) Patent No.: US 12,560,100 B1
(45) Date of Patent: Feb. 24, 2026

(54) DOUBLE DIRECTIONALLY PRE-LOADED DAMPED BALL BEARING

(71) Applicant: Pratt & Whitney Canada Corp., Longueuil (CA)

(72) Inventor: Ian Macfarlane, St-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/916,340

(22) Filed: Oct. 15, 2024

(51) Int. Cl.
| | |
|---|---|
| *F01D 25/16* | (2006.01) |
| *F01D 25/24* | (2006.01) |
| *F16C 27/04* | (2006.01) |

(52) U.S. Cl.
CPC ........... *F01D 25/162* (2013.01); *F01D 25/24* (2013.01); *F16C 27/045* (2013.01); *F05D 2240/50* (2013.01); *F16C 2360/23* (2013.01)

(58) Field of Classification Search
CPC .................................................... F01D 25/162
See application file for complete search history.

(56) References Cited

U.S. PATENT DOCUMENTS

| | | | |
|---|---|---|---|
| 5,316,393 | A | 5/1994 | Daugherty |
| 9,658,132 | B2 | 5/2017 | Gallimore et al. |
| 11,021,994 | B2 * | 6/2021 | Cartier ................... F01D 25/16 |
| 11,035,252 | B2 * | 6/2021 | Davis .................... F01D 25/162 |
| 11,976,593 | B1 | 5/2024 | Ganiger et al. |
| 12,025,017 | B2 * | 7/2024 | Quintin ..................... F02C 7/06 |
| 2023/0243276 | A1 * | 8/2023 | Quintin ................... F16C 19/54 |
| | | | 415/229 |

FOREIGN PATENT DOCUMENTS

EP          1431600 A1     6/2004

* cited by examiner

*Primary Examiner* — Courtney D Heinle
*Assistant Examiner* — John S Hunter, Jr.
(74) *Attorney, Agent, or Firm* — CANTOR COLBURN LLP

(57) ABSTRACT
A gas turbine engine of an aircraft is provided. The gas turbine engine includes a shaft, a housing and an auxiliary ball bearing assembly to rotatably support the shaft within the housing. The auxiliary ball bearing assembly includes inner and outer races, ball bearings between the inner and outer races, an axial spring anchored between the housing and the outer race to prevent axial movement of the shaft during overhaul and an oil cavity defined between the housing and the outer race for axial damping during the overhaul and for radial damping during operational conditions.

20 Claims, 4 Drawing Sheets

1

DOUBLE DIRECTIONALLY PRE-LOADED DAMPED BALL BEARING

BACKGROUND

The present disclosure relates to gas turbine engines and, in particular, to a double directionally pre-loaded damped ball bearing of a gas turbine engine.

In a gas turbine engine, fuel and compressed air are combusted in a combustor to produce a high-temperature and high-pressure fluid. This fluid enters a turbine and interacts with rows or stages of turbine blades and vanes. The interaction between the high-temperature and high-pressure fluid with the turbine blades and vanes causes the stages of turbine blades to rotate a shaft. The shaft rotation drives a compressor to compress the air for the combustor and, as noted above, can be used to drive operations of a generator to produce electricity and/or for propulsion.

Besides gas turbine engines, other types of engines of aircraft propulsion systems are available. These include, but are not limited to, electrical engines and hybrid engines.

In any case, a gearbox is typically interposed between the engine or power source and a component to be powered, such as a propeller. The gearbox drives the components at a required speed and carries resulting torque and loads.

SUMMARY

According to an aspect of the disclosure, a gas turbine engine of an aircraft is provided. The gas turbine engine includes a shaft, a housing and an auxiliary ball bearing assembly to rotatably support the shaft within the housing. The auxiliary ball bearing assembly includes inner and outer races, ball bearings between the inner and outer races, an axial spring anchored between the housing and the outer race to prevent axial movement of the shaft during overhaul and an oil cavity defined between the housing and the outer race for axial damping during the overhaul and for radial damping during operational conditions.

In accordance with additional and/or alternative embodiments, the outer race defines first and second piston ring slots and the gas turbine engine further includes first and second piston ring seals disposed in the first and second piston ring slots, respectively, to seal the oil cavity.

In accordance with additional and/or alternative embodiments, the axial spring includes first and second axial springs respectively anchored between the housing and the outer race.

In accordance with additional and/or alternative embodiments, the axial spring includes a single dual-acting spring.

According to an aspect of the disclosure, a gas turbine engine of an aircraft is provided and includes a shaft, a housing including first, second and third flanges, a first axial member and a second axial member and an auxiliary ball bearing assembly to rotatably support the shaft within the housing. The auxiliary ball bearing assembly includes an inner race, an outer race including an outboard section having first and second radial faces, an inboard section having a third radial face and an axial section between the outboard section and the inboard section, ball bearings between the inner and outer races, first and second axial springs anchored between the first flange and the first radial face and between the third flange and the third radial face, respectively, and an oil cavity defined between the second flange and the first and second axial members of the housing and the second radial face and the axial section of the outer race.

In accordance with additional and/or alternative embodiments, the first and second axial springs prevent axial movement of the shaft during overhaul and the oil cavity is disposed for axial damping during the overhaul and for radial damping during operational conditions.

In accordance with additional and/or alternative embodiments, the first and second flanges are radially aligned, the third flange is inboard of the first and second flanges and the second axial member is inboard of the first axial member and the outboard section is outboard of the inboard section and the axial section and includes a radial section extending radially outwardly from the axial section.

In accordance with additional and/or alternative embodiments, the first and second radial faces at least partially radially overlap with the first and second flanges and the third radial face at least partially radially overlaps with the third flange.

In accordance with additional and/or alternative embodiments, the first axial member is axially interposed between the first and second flanges, the second axial member is axially interposed between the second and third flanges and the axial section at least partially axially overlaps with the second flange and the first and second axial members.

In accordance with additional and/or alternative embodiments, the outer race defines a first piston ring slot between the first and second radial faces and a second piston ring slot between the third radial face and the axial section and the gas turbine engine further includes first and second piston ring seals disposed in the first and second piston ring slots, respectively, to seal the oil cavity.

In accordance with additional and/or alternative embodiments, the ball bearings are spherical ball bearings.

According to an aspect of the disclosure, a gas turbine engine of an aircraft is provided. The gas turbine engine includes a shaft, a housing including first and second flanges, a first axial member and a second axial member and an auxiliary ball bearing assembly to rotatably support the shaft within the housing. The auxiliary ball bearing assembly includes an inner race, an outer race including an outboard section having first and second radial faces, an inboard section and an axial section between the outboard section and the inboard section, ball bearings between the inner and outer races, an axial spring anchored between the first flange and the first radial face and an oil cavity defined between the second flange and the first and second axial members of the housing and the second radial face and the axial section of the outer race.

In accordance with additional and/or alternative embodiments, the axial spring prevents axial movement of the shaft during overhaul and the oil cavity is disposed for axial damping during the overhaul and for radial damping during operational conditions.

In accordance with additional and/or alternative embodiments, the first and second flanges are radially aligned and the second axial member is inboard of the first axial member and the outboard section is outboard of the inboard section and the axial section and includes a radial section extending radially outwardly from the axial section.

In accordance with additional and/or alternative embodiments, the first and second radial faces at least partially radially overlap with the first and second flanges.

In accordance with additional and/or alternative embodiments, the first axial member is axially interposed between the first and second flanges and the axial section at least partially axially overlaps with the second flange and the first and second axial members.

In accordance with additional and/or alternative embodiments, the outer race defines a first piston ring slot between the first and second radial faces and a second piston ring slot adjacent to the axial section and the gas turbine engine further includes first and second piston ring seals disposed in the first and second piston ring slots, respectively, to seal the oil cavity.

In accordance with additional and/or alternative embodiments, the ball bearings are spherical ball bearings.

In accordance with additional and/or alternative embodiments, the axial spring includes a dual-acting spring.

In accordance with additional and/or alternative embodiments, a second axial spring is anchored between the second flange and the second radial face.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The following disclosure is applicable to any type of gas turbine engine, including, but not limited to, turbofans, turboshafts, turboprops, turbojets, electrical drives, hybrid drives, etc. The gas turbine engine described below is provided by way of example, and should not be interpreted as limiting the scope of the application or the claims in any way.

Figure 1:
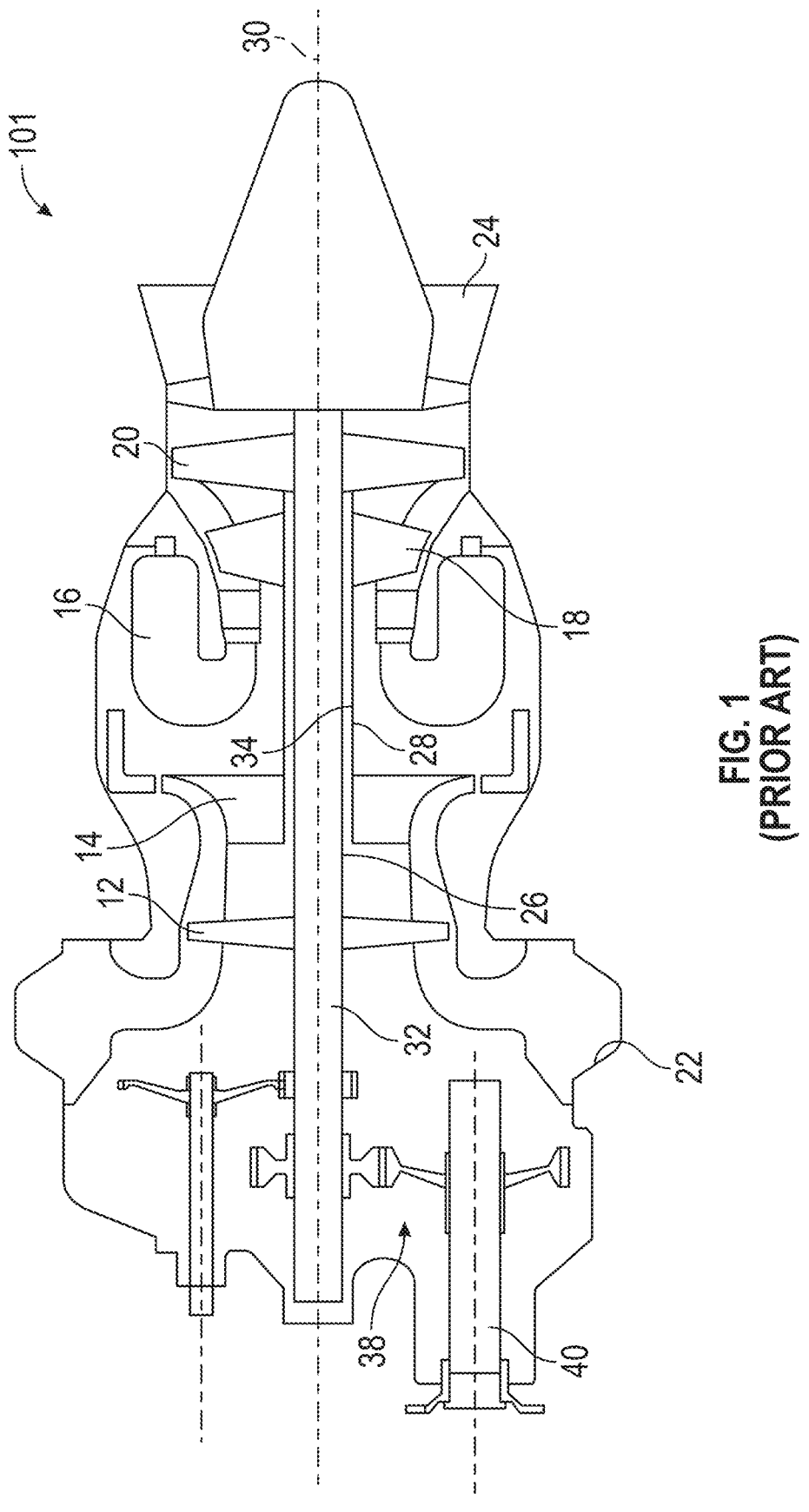
FIG. 1 is a cross-sectional view of a prior art turboshaft engine.

With reference to FIG. 1, a turboshaft engine 101 is provided and configured as a gas turbine engine. In particular, the turboshaft engine 101 is a generally conventional turboshaft engine generally including, in serial flow communication, a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14 and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The turboshaft engine 101 has multiple, i.e. two or more, spools which may perform the compression to pressurize the air received through an air inlet 22, and which extract energy from the combustion gases before they exit via an exhaust outlet 24. For example, the turboshaft engine 101 can include a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The turboshaft engine 101 may further include a transmission 38 driven by the low pressure shaft 32 and driving a rotatable output shaft 40. The transmission 38 may vary a ratio between rotational speeds of the low pressure shaft 32 and the output shaft 40.

Regular maintenance of turbo-shaft engines, such as the turbo-shaft engine 101 of FIG. 1, often requires overhaul that necessitates that certain components of turbo-shaft engines are removed. In some cases, it is desirable to conduct such overhauls without removing or permitting the shaft (i.e., the low pressure shaft 32 and/or the high pressure shaft 34 of FIG. 1) to move due to the size and weight of the shaft. Preventing shaft movement during overhaul is particularly important once a main bearing is removed because, at this point, the shaft has a relatively high-risk of axial movement.

In one solution to the problem of preventing axial movement of the shaft during overhaul once the main bearing is removed, an auxiliary bearing is provided to support the shaft in the form of a ball bearing. It has been found, however, that the ball bearing of the auxiliary bearing tends to skid during operational conditions. This skidding can lead to wear and damage.

A need therefore exists for a gas turbine engine, such as a gas turbine engine of an aircraft, that includes a ball bearing as an auxiliary bearing for support of the shaft during overhaul once the main bearing is removed but that will not tend to skid during operational conditions.

Figure 2:
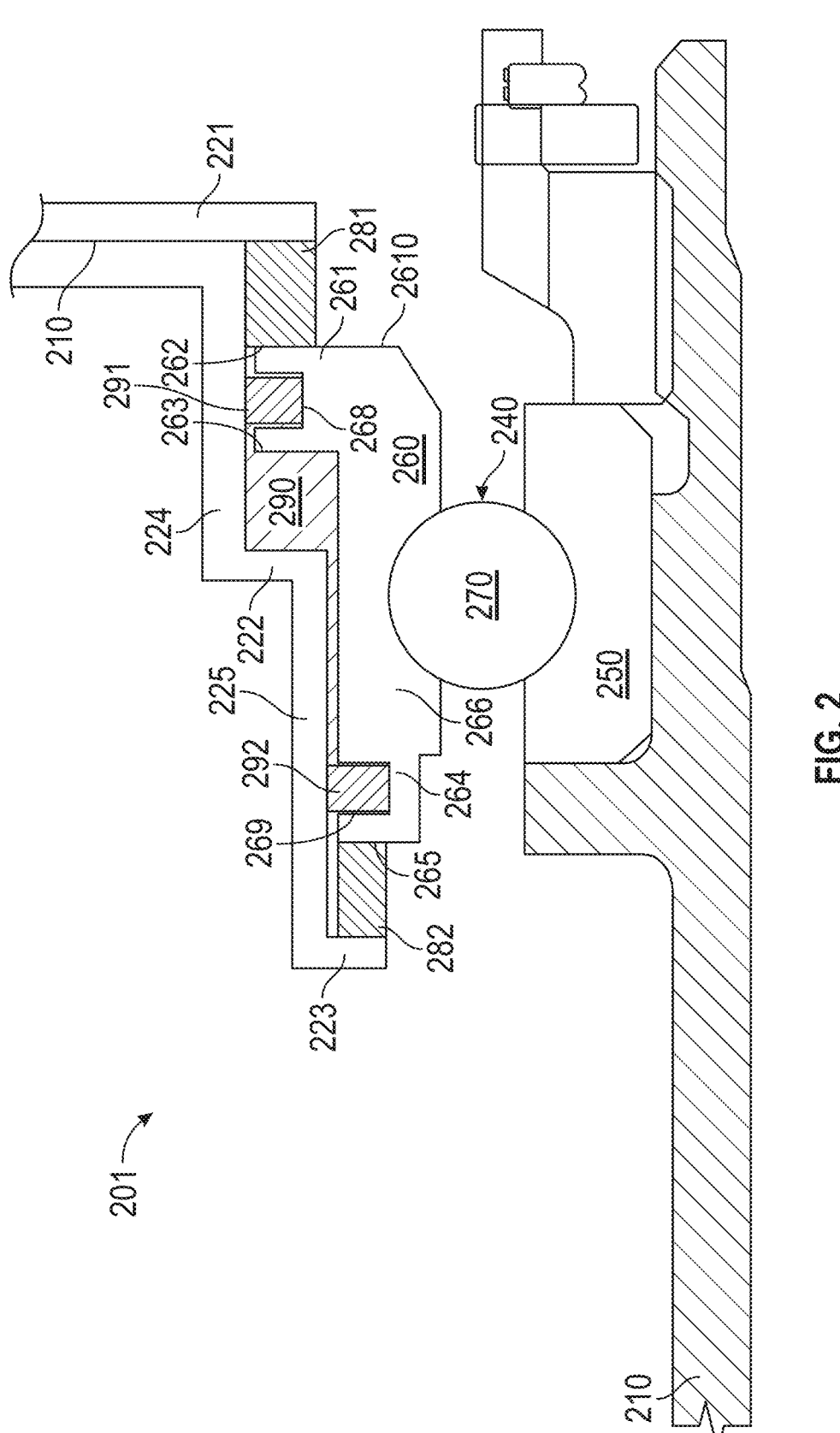
FIG. 2 is a side schematic view of a portion of a gas turbine engine of an aircraft in accordance with embodiments.

With reference to FIG. 2, a gas turbine engine 201 of an aircraft is provided and includes a shaft 210, which is rotatable about a rotational axis thereof, a housing 220 and an auxiliary ball bearing assembly 240. The housing 220 includes a first flange 221, a second flange 222 and a third flange 223. The housing 220 also includes a first axial member 224 and a second axial member 225. The auxiliary ball bearing assembly 240 is disposed to rotatably support the shaft 210 within the housing 220 particularly during overhaul once a main bearing of the shaft 210 is removed in order to prevent axial movement of the shaft 210. The auxiliary ball bearing assembly 240 is further disposed to provide axial damping for centering the shaft 210.

The auxiliary ball bearing assembly 240 includes an inner race 250 that is rotatable with the shaft 210, an outer race 260, ball bearings 270 between the inner race 250 and the outer race 260, a first axial spring 281, a second axial spring 282 and an oil cavity 290. The outer race 260 includes an outboard section 261 having a first radial face 262 and a second radial face 263, an inboard section 264 having a third radial face 265 and an axial section 266 that extends axially between the outboard section 261 and the inboard section 264. The ball bearings 270 can be spherical ball bearings or other similar types of ball bearings. The first axial spring 281 is anchored at opposite ends thereof between the first flange 221 and the first radial face 262. The second axial spring 282 is anchored at opposite ends thereof between the third flange 223 and the third radial face 265. The oil cavity 290 is defined between the second flange 222, the first axial member 224 and the second axial member 225 of the housing 220 and the second radial face 263 and the axial section 266 of the outer race 260.

The outer race 260 is formed to define a first piston ring slot 268 between the first radial face 262 and the second radial face 263 and a second piston ring slot 269 between the third radial face 265 and the axial section 266. The gas turbine engine 201 can further include a first piston ring seal 291 and a second piston ring seal 292 disposed in the first piston ring slot 268 and in the second piston ring slot 269, respectively, to seal the oil cavity 290.

With this configuration, the first axial spring 281 and the second axial spring 282 cooperatively prevent axial movement of the shaft 210 during overhaul, particularly once the main bearing is removed, and the oil cavity 290 is disposed for axial damping of the shaft 210 during the overhaul and for radial damping during operational conditions of the gas turbine engine 201 to prevent skidding.

In accordance with embodiments and as shown in FIG. 2, the first flange 221 and the second flange 222 are partially radially aligned, the third flange 223 is inboard of the first flange 221 and the second flange 222 and the second axial member 225 is inboard of the first axial member 224 and the outboard section 261 is outboard of the inboard section 264 and the axial section 266 and includes a radial section 2610 that extends radially outwardly from the axial section 266. The first radial face 262 and the second radial face 263 at least partially radially overlap with the first flange 221 and the second flange 222 and the third radial face 265 at least partially radially overlap with the third flange 223. Also, the first axial member 224 is axially interposed between the first flange 221 and the second flange 222, the second axial member 225 is axially interposed between the second flange 222 and the third flange 223 and the axial section 266 at least partially axially overlaps with the second flange 222 and the first axial member 224 and the second axial member 225.

Figure 3:
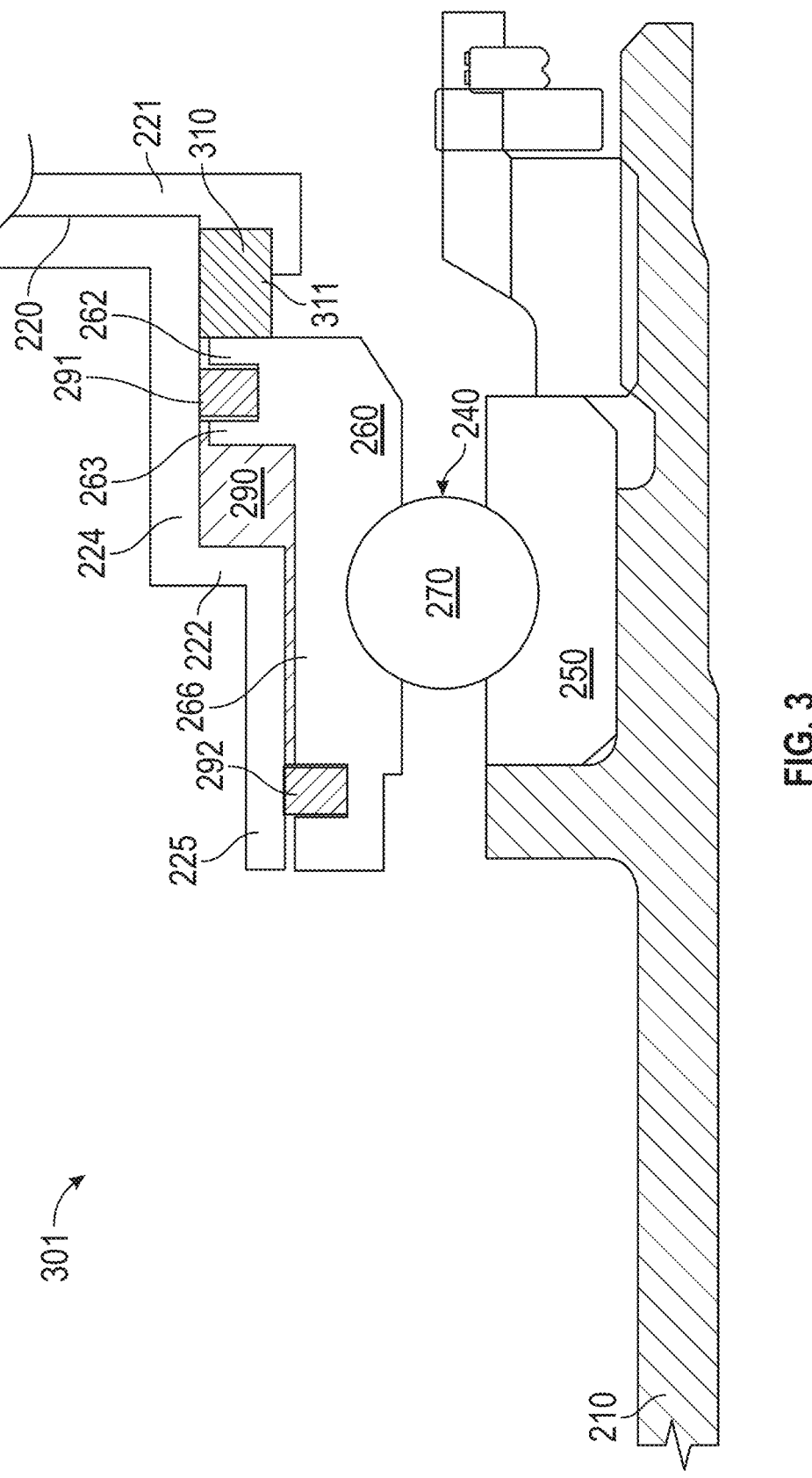
FIG. 3 is a side schematic view of a portion of a gas turbine engine of an aircraft with a single dual-acting axial spring in accordance with embodiments.
Figure 4:
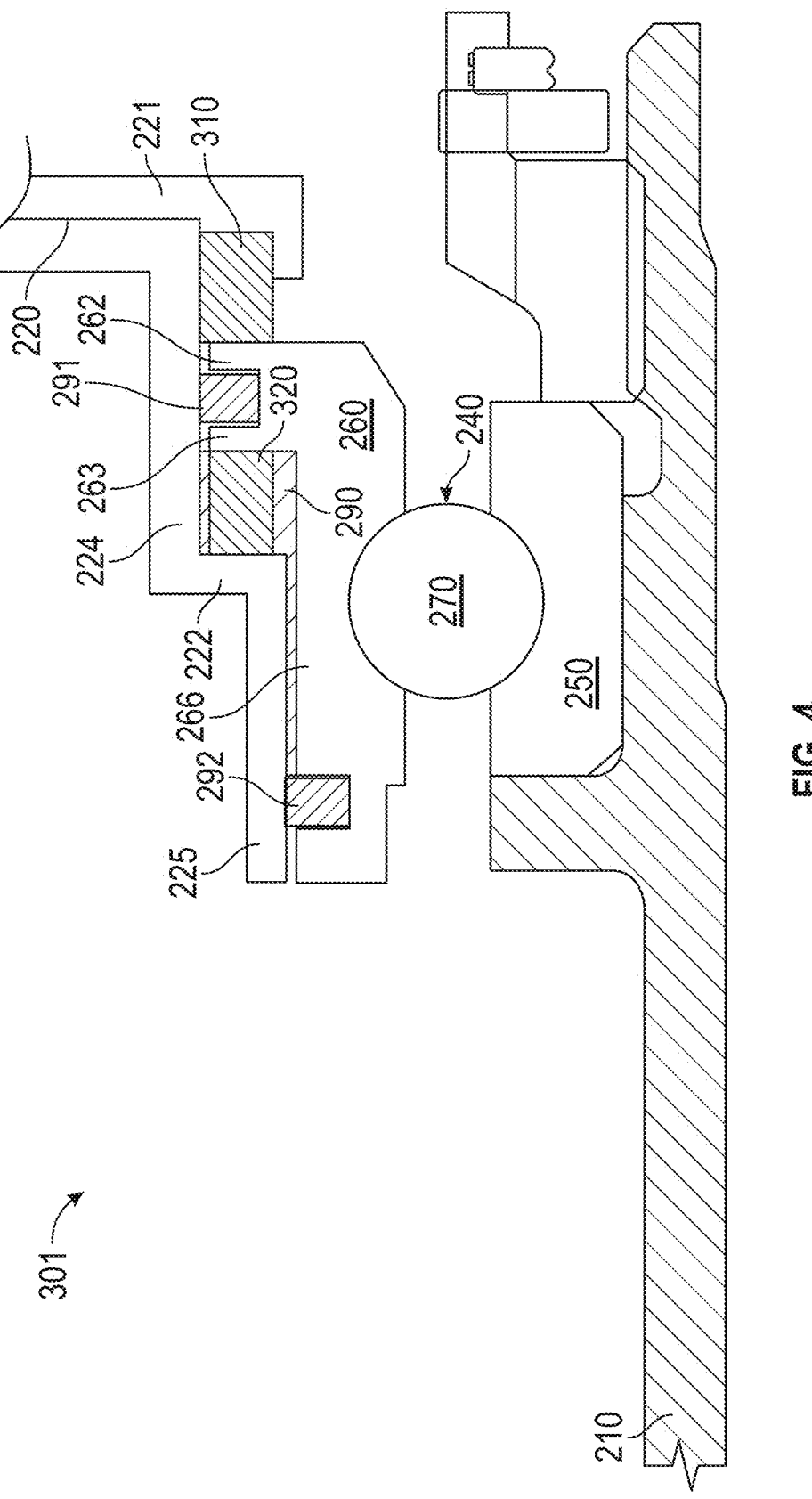
FIG. 4 is a side schematic view of a portion of a gas turbine engine of an aircraft with an axial spring and a second axial spring in accordance with embodiments.

With reference to FIGS. 3 and 4, a gas turbine engine 301 of an aircraft is provided similarly as the gas turbine engine 201 of FIG. 2 and will not be described in detail except for the differences between the gas turbine engine 301 and the gas turbine engine 201 of FIG. 2. In the gas turbine engine 301, the housing 220 includes the first flange 221 and the second flanges 222 but does not include a third flange. The gas turbine engine 301 further includes an axial spring 310 that is anchored between the first flange 221 and the first radial face 262 and the oil cavity 290 is defined between the second flange 222, the first axial member 224 and the second axial member 225 of the housing 220 and the second radial face 263 and the axial section 266 of the outer race 260.

As with the configuration of the gas turbine engine 201 of FIG. 2, with the above-noted configuration of the gas turbine engine 301 of FIGS. 3 and 4, the axial spring 310 prevents axial movement of the shaft 210 during overhaul, particularly once the main bearing is removed, and the oil cavity 290 is disposed for axial damping of the shaft 210 during the overhaul and for radial damping during operational conditions of the gas turbine engine 201 to prevent skidding.

As shown in FIG. 3, the axial spring 310 includes or is provided as a single dual-acting axial spring 311. As shown in FIG. 4, in addition to the axial spring 310, the gas turbine engine 301 includes a second axial spring 320 that is anchored between the second flange 222 and the second radial face 263.

Thus, as will be described below, a shaft of a gas turbine engine is provided with a ball bearing assembly as an auxiliary bearing for support of the shaft during overhaul once the main bearing is removed that will not tend to skid during operational conditions. The ball bearing assembly includes an auxiliary ball bearing, springs that are loaded against the auxiliary ball bearing to prevent axial movement of the shaft during overhaul and oil pressure cavities. The oil pressure cavities provide for radial damping for centering the shaft and axial loading that prevents skidding during operational conditions.

Technical effects and benefits of the present disclosure are the provision of an improved auxiliary bearing of a shaft of a gas turbine engine. The auxiliary bearing includes an auxiliary ball bearing, springs that are loaded against the auxiliary ball bearing to prevent axial movement of the shaft during overhaul and oil pressure cavities. The oil pressure cavities provide for radial damping for centering the shaft and axial loading that prevents skidding during operational conditions.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A gas turbine engine of an aircraft, comprising:
a shaft;
a housing; and
an auxiliary ball bearing assembly to rotatably support the shaft within the housing and comprising:
inner and outer races;
ball bearings between the inner and outer races;
an axial spring anchored between the housing and the outer race to prevent axial movement of the shaft during overhaul; and
an oil cavity having a first cavity portion with a forward side and a second cavity portion with an aft side, the aft side of the second cavity portion being fluidly communicative with the forward side of the first cavity portion,
the first cavity portion being defined between the second flange and a forward portion of the first axial member of the housing and the second radial face and an aft portion of the axial section of the outer race, and
the second cavity portion being defined between the second axial members of the housing and a forward portion of the axial section of the outer race.

2. The gas turbine engine according to claim 1, wherein:
the outer race defines first and second piston ring slots; and
the gas turbine engine further comprises first and second piston ring seals disposed in the first and second piston ring slots, respectively, to seal the oil cavity.

3. The gas turbine engine according to claim 1, wherein the axial spring comprises first and second axial springs respectively anchored between the housing and the outer race.

4. The gas turbine engine according to claim 1, wherein the axial spring comprises a single dual-acting spring.

5. A gas turbine engine of an aircraft, comprising:
a shaft;
a housing comprising first, second and third flanges, a first axial member and a second axial member; and
an auxiliary ball bearing assembly to rotatably support the shaft within the housing and comprising:
an inner race;
an outer race comprising an outboard section having first and second radial faces, an inboard section having a third radial face and an axial section between the outboard section and the inboard section;
ball bearings between the inner and outer races;
first and second axial springs anchored between the first flange and the first radial face and between the third flange and the third radial face, respectively; and
an oil cavity having a first cavity portion with a forward side and a second cavity portion with an aft side, the aft side of the second cavity portion being fluidly communicative with the forward side of the first cavity portion,
the first cavity portion being defined between the second flange and a forward portion of the first axial member of the housing and the second radial face and an aft portion of the axial section of the outer race, and

the second cavity portion being defined between the second axial members of the housing and a forward portion of the axial section of the outer race.

6. The gas turbine engine according to claim 5, wherein:
the first and second axial springs prevent axial movement of the shaft during overhaul, and
the oil cavity is disposed for axial damping during the overhaul and for radial damping during operational conditions.

7. The gas turbine engine according to claim 5, wherein:
the first and second flanges are radially aligned, the third flange is inboard of the first and second flanges and the second axial member is inboard of the first axial member, and
the outboard section is outboard of the inboard section and the axial section and comprises a radial section extending radially outwardly from the axial section.

8. The gas turbine engine according to claim 7, wherein the first and second radial faces at least partially radially overlap with the first and second flanges and the third radial face at least partially radially overlaps with the third flange.

9. The gas turbine engine according to claim 5, wherein:
the first axial member is axially interposed between the first and second flanges,
the second axial member is axially interposed between the second and third flanges, and
the axial section at least partially axially overlaps with the second flange and the first and second axial members.

10. The gas turbine engine according to claim 5, wherein:
the outer race defines a first piston ring slot between the first and second radial faces and a second piston ring slot between the third radial face and the axial section, and
the gas turbine engine further comprises first and second piston ring seals disposed in the first and second piston ring slots, respectively, to seal the oil cavity.

11. The gas turbine engine according to claim 5, wherein the ball bearings are spherical ball bearings.

12. A gas turbine engine of an aircraft, comprising:
a shaft;
a housing comprising first and second flanges, a first axial member and a second axial member; and
an auxiliary ball bearing assembly to rotatably support the shaft within the housing and comprising:
an inner race;
an outer race comprising an outboard section having first and second radial faces, an inboard section and an axial section between the outboard section and the inboard section;
ball bearings between the inner and outer races;
an axial spring anchored between the first flange and the first radial face; and
an oil cavity having a first cavity portion with a forward side and a second cavity portion with an aft side, the aft side of the second cavity portion being fluidly communicative with the forward side of the first cavity portion,
the first cavity portion being defined between the second flange and a forward portion of the first axial member of the housing and the second radial face and an aft portion of the axial section of the outer race, and
the second cavity portion being defined between and the second axial members of the housing and a forward portion of the axial section of the outer race.

13. The gas turbine engine according to claim 12, wherein:

the axial spring prevents axial movement of the shaft during overhaul, and the oil cavity is disposed for axial damping during the overhaul and for radial damping during operational conditions.

14. The gas turbine engine according to claim 12, wherein:

the first and second flanges are radially aligned and the second axial member is inboard of the first axial member, and the outboard section is outboard of the inboard section and the axial section and comprises a radial section extending radially outwardly from the axial section.

15. The gas turbine engine according to claim 14, wherein the first and second radial faces at least partially radially overlap with the first and second flanges.

16. The gas turbine engine according to claim 12, wherein:

the first axial member is axially interposed between the first and second flanges, and the axial section at least partially axially overlaps with the second flange and the first and second axial members.

17. The gas turbine engine according to claim 12, wherein:

the outer race defines a first piston ring slot between the first and second radial faces and a second piston ring slot adjacent to the axial section, and the gas turbine engine further comprises first and second piston ring seals disposed in the first and second piston ring slots, respectively, to seal the oil cavity.

18. The gas turbine engine according to claim 12, wherein the ball bearings are spherical ball bearings.

19. The gas turbine engine according to claim 12, wherein the axial spring comprises a dual-acting spring.

20. The gas turbine engine according to claim 12, further comprising a second axial spring anchored between the second flange and the second radial face.

* * * * *